(12) United States Patent
Shimakage

(10) Patent No.: US 10,688,995 B2
(45) Date of Patent: Jun. 23, 2020

(54) METHOD FOR CONTROLLING TRAVEL AND DEVICE FOR CONTROLLING TRAVEL OF VEHICLE

(71) Applicant: Nissan Motor Co., Ltd., Yokohama-shi, Kanagawa (JP)

(72) Inventor: Masayasu Shimakage, Kanagawa (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 16/333,883

(22) PCT Filed: Sep. 21, 2016

(86) PCT No.: PCT/JP2016/077806
§ 371 (c)(1),
(2) Date: Mar. 15, 2019

(87) PCT Pub. No.: WO2018/055689
PCT Pub. Date: Mar. 29, 2018

(65) Prior Publication Data
US 2019/0202459 A1    Jul. 4, 2019

(51) Int. Cl.
*B60W 30/00*    (2006.01)
*B60W 50/00*    (2006.01)
(Continued)

(52) U.S. Cl.
CPC ........ *B60W 30/165* (2013.01); *B60W 50/082* (2013.01); *G05D 1/0212* (2013.01);
(Continued)

(58) Field of Classification Search
CPC .... B60W 30/00; B60W 30/16; B60W 30/165; B60W 50/00; G08G 1/00; G08G 1/22;
(Continued)

(56) References Cited

U.S. PATENT DOCUMENTS

| | | | |
|---|---|---|---|
| 5,572,449 A | 11/1996 | Tang et al. | |
| 5,969,969 A * | 10/1999 | Ejiri | G01C 21/26 701/300 |

(Continued)

FOREIGN PATENT DOCUMENTS

| | | |
|---|---|---|
| CN | 102673560 A | 9/2012 |
| JP | 2005263058 A | 9/2005 |

(Continued)

*Primary Examiner* — Yonel Beaulieu
(74) *Attorney, Agent, or Firm* — Young Basile Hanlon & MacFarland, P.C.

(57) ABSTRACT

In a travel control method for a vehicle in which a certain target inter-vehicle distance is set from among a plurality of settable target inter-vehicle distances and a subject vehicle is controlled to follow, in an automated or autonomous manner, a traveling trajectory of a preceding vehicle traveling ahead of the subject vehicle, when a trajectory-following travel mode for following the traveling trajectory of the preceding vehicle in the automated or autonomous manner transitions from an OFF state to an ON state, the target inter-vehicle distance between the subject vehicle and the preceding vehicle is set to a relatively small value from among the settable values.

8 Claims, 10 Drawing Sheets

(51) Int. Cl.
- *G05D 1/00* (2006.01)
- *G08G 1/00* (2006.01)
- *G08G 1/16* (2006.01)
- *B60W 30/165* (2020.01)
- *G05D 1/02* (2020.01)
- *B60W 50/08* (2020.01)

(52) U.S. Cl.
CPC .......... *G08G 1/16* (2013.01); *B60K 2310/262* (2013.01); *B60W 2552/15* (2020.02); *B60W 2552/20* (2020.02); *B60W 2552/30* (2020.02); *B60W 2556/50* (2020.02); *B60W 2754/30* (2020.02); *G05D 2201/0213* (2013.01)

(58) Field of Classification Search
CPC .......... G08G 1/16; B60K 31/00; H04W 4/00; H04W 4/46
See application file for complete search history.

(56) References Cited

U.S. PATENT DOCUMENTS

| | | | | |
|---|---|---|---|---|
| 10,275,797 | B2* | 4/2019 | Freytag | G01S 7/4021 |
| 2008/0288152 | A1* | 11/2008 | Isaji | B60K 31/0008 701/96 |
| 2009/0164109 | A1 | 6/2009 | Maruyama | |
| 2012/0239269 | A1 | 9/2012 | Bonne | |
| 2013/0158830 | A1 | 6/2013 | Kurumisawa et al. | |
| 2014/0180569 | A1 | 6/2014 | Ueda et al. | |
| 2017/0329348 | A1* | 11/2017 | Li | G05D 1/0212 |
| 2017/0349177 | A1 | 12/2017 | Andersson et al. | |
| 2018/0025643 | A1* | 1/2018 | Yamamoto | B60K 31/00 701/23 |
| 2018/0037226 | A1* | 2/2018 | Otake | B60W 10/04 |
| 2018/0141545 | A1* | 5/2018 | Freytag | G05D 1/0221 |
| 2019/0049968 | A1* | 2/2019 | Dean | G05D 1/0088 |
| 2019/0137617 | A1* | 5/2019 | Chapuis | G01S 11/00 |
| 2019/0168757 | A1* | 6/2019 | Tokimasa | B60K 31/00 |
| 2019/0310637 | A1* | 10/2019 | Dean | G05D 1/0255 |
| 2019/0369616 | A1* | 12/2019 | Ostafew | G05D 1/0088 |

FOREIGN PATENT DOCUMENTS

| | | |
|---|---|---|
| JP | 2007145201 A | 6/2007 |
| JP | 2007245835 A | 9/2007 |
| JP | 2007320458 A | 12/2007 |
| JP | 2008207729 A | 9/2008 |
| JP | 2009149254 A | 7/2009 |
| JP | 2010-286962 A | 12/2010 |
| JP | 2014123283 A | 7/2014 |
| KR | 20120000818 A | 1/2012 |
| KR | 20130009085 A | 1/2013 |
| KR | 20130069417 A | 6/2013 |
| WO | 2016122383 A1 | 8/2016 |

* cited by examiner

METHOD FOR CONTROLLING TRAVEL AND DEVICE FOR CONTROLLING TRAVEL OF VEHICLE

TECHNICAL FIELD

The present invention relates to a travel control method and a travel control apparatus that control the travel of a vehicle.

BACKGROUND

A device for controlling the inter-vehicle distance between a subject vehicle and a preceding vehicle is known (for example, Japanese Patent Application JP2007-320458A). This device operates to capture an image ahead of the subject vehicle using a camera to detect a traffic signal and a preceding vehicle located ahead and, when the traffic signal and the preceding vehicle are detected but the traffic signal then becomes undetected, control the travel of the vehicle so as to increase the inter-vehicle distance between the subject vehicle and the preceding vehicle.

However, when the subject vehicle travels to follow the preceding vehicle in an automated or autonomous manner, if the inter-vehicle distance between the subject vehicle and the preceding vehicle is increased as in the above prior art, it will be difficult to detect the traveling trajectory of the preceding vehicle. This may be problematic.

SUMMARY

A problem to be solved by the present invention is to provide a travel control method for a vehicle and a travel control apparatus for a vehicle with which when the vehicle travels to follow the traveling trajectory of a preceding vehicle in an automated or autonomous manner, the traveling trajectory of the preceding vehicle can be appropriately detected.

The present invention solves the above problem in the following manner. In a travel control method for a vehicle in which a certain target inter-vehicle distance is set from among a plurality of settable target inter-vehicle distances and a subject vehicle is controlled to follow, in an automated or autonomous manner, a traveling trajectory of a preceding vehicle traveling ahead of the subject vehicle, when a trajectory-following travel mode for following the traveling trajectory of the preceding vehicle in the automated or autonomous manner transitions from an OFF state to an ON state or when the subject vehicle approaches a curve, an intersection, a slope, or an interchange, the target inter-vehicle distance between the subject vehicle and the preceding vehicle is set to a relatively small value from among the settable values.

According to the present invention, in a specific situation in which it is estimated that the detection of a preceding vehicle is difficult, the target inter-vehicle distance between the subject vehicle and the preceding vehicle is set to a relatively small value from among the settable values and the subject vehicle therefore comes relatively close to the preceding vehicle. This allows the preceding vehicle to be easily detected.

DETAILED DESCRIPTION

Hereinafter, the apparatus and method for controlling the travel of a vehicle according to an embodiment of the present invention will be described with reference to the drawings. In this embodiment, the present invention will be described by exemplifying a travel control apparatus equipped in a vehicle.

Figure 1:
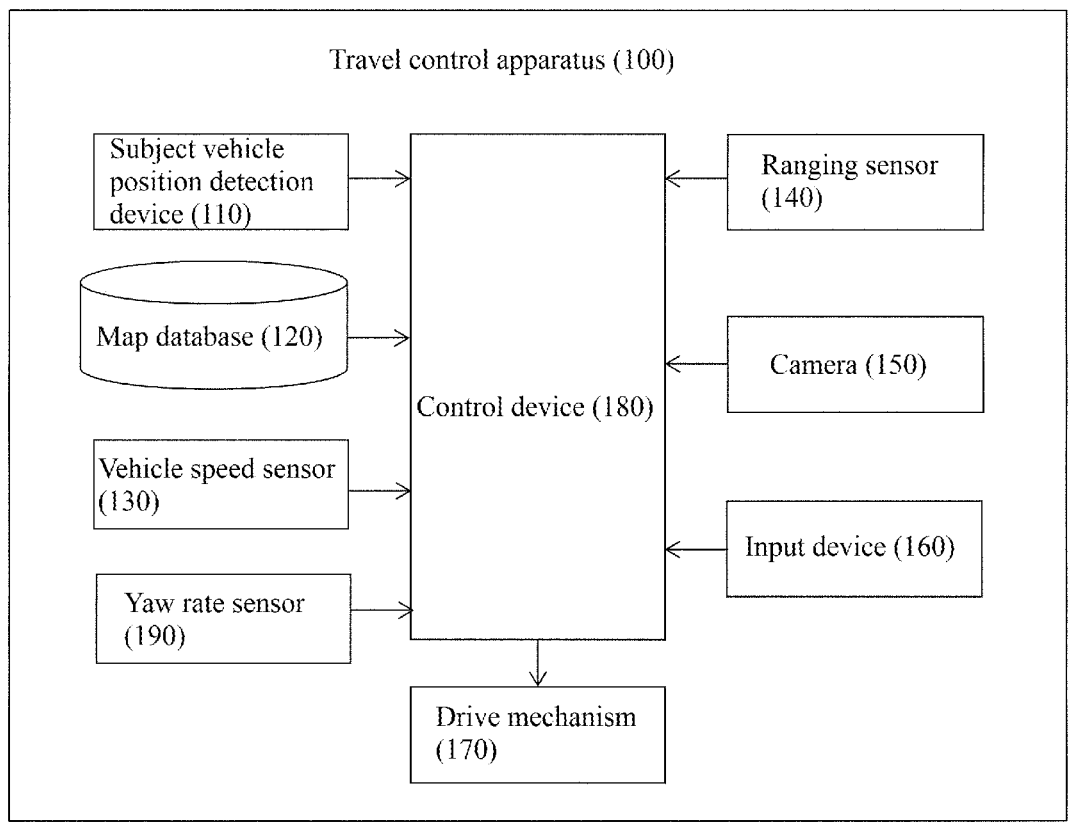
FIG. 1 is a block diagram illustrating a travel control apparatus according to an embodiment of the present invention.

FIG. 1 is a block diagram illustrating the configuration of a travel control apparatus 100 for a vehicle according to an embodiment of the present invention. As illustrated in FIG. 1, the travel control apparatus 100 according to the present embodiment comprises a subject vehicle position detection device 110, a map database 120, a vehicle speed sensor 130, a ranging sensor 140, a camera 150, an input device 160, a drive mechanism 170, a control device 180, and a yaw rate sensor 190. These components are connected to one another via a controller area network (CAN) or other in-vehicle LAN for mutually exchanging information.

The subject vehicle position detection device 110, which includes a GPS unit, detects radio waves transmitted from a plurality of communication satellites to periodically acquire positional information of the subject vehicle and detects the current position of the subject vehicle on the basis of the acquired positional information of the subject vehicle, angle variation information acquired from a gyro-sensor, and a vehicle speed acquired from the vehicle speed sensor. In addition or alternatively, the subject vehicle position detection device 110 can detect the position of the subject vehicle using a well-known map matching technique.

The map database 120 stores map information. In the map information stored in the map database 120, information on the road shape at each map coordinate is recorded so as to be associated with the map coordinate. For example, attributes regarding curves, slopes, intersections, interchanges, narrow roads, straight roads, road shoulder structures, and merging points are recorded in the map information so as to be associated with the map coordinates.

The vehicle speed sensor 130 measures the rotation speed of a drive system, such as a drive shaft, and detects the traveling speed (also referred to as a "vehicle speed," hereinafter) of the subject vehicle on the basis of the measured rotation speed. The vehicle speed information of the subject vehicle detected by the vehicle speed sensor 130 is output to the control device 180. The yaw rate sensor 190, which is attached to an appropriate site such as a site in the vehicle interior, detects the yaw rate (rate of change in the rotation angle in the turning direction) of the subject vehicle, and the detected yaw rate information of the subject vehicle is output to the control device 180.

The ranging sensor 140 detects an object existing around the subject vehicle. The ranging sensor 140 also calculates the relative distance and relative speed between the subject vehicle and the object. Information on the object detected by the ranging sensor 140 is transmitted to the control device 180. Examples of such a ranging sensor 140 include a laser radar and a millimeter wave radar.

The camera 150 captures images of a road and/or an object around the subject vehicle. In the present embodiment, the camera 150 captures images ahead of the subject vehicle. The image information captured by the camera 150 is transmitted to the control device 180.

The input device 160 is an operation member that can be operated by a driver. In the present embodiment, the driver can operate the input device 160 thereby to set ON/OFF of the automated or autonomous travel control. In the automated or autonomous travel control of the vehicle according to the present embodiment, when a preceding vehicle is present ahead of the subject vehicle, inter-vehicle distance control is performed in which the subject vehicle is controlled to travel so that the inter-vehicle distance between the subject vehicle and the preceding vehicle is maintained at an inter-vehicle distance that is set by the driver, while when no preceding vehicle is present ahead of the subject vehicle, speed control is performed in which the subject vehicle is controlled to travel at a vehicle speed that is set by the driver. In the present embodiment, the driver can operate the input device 160 thereby to set a set vehicle speed (e.g. a specific speed value) of the subject vehicle in the speed control and a set inter-vehicle distance (e.g. any of three stages of a short distance, a medium distance, and a long distance) in the inter-vehicle distance control.

The drive mechanism 170 includes an engine and/or a motor (power system), a brake (braking system), and a steering actuator (steering system) for controlling the subject vehicle to travel in an automated or autonomous manner. In the present embodiment, when performing the automated or autonomous travel control to be described later, the control device 180 controls the operation of the drive mechanism 170.

The control device 180 is composed of a read only memory (ROM) that stores programs for controlling travel of the subject vehicle, a central processing unit (CPU) that executes the programs stored in the ROM, and a random access memory (RAM) that serves as an accessible storage device. As substitute for or in addition to the CPU, a micro processing unit (MPU), a digital signal processor (DSP), an application specific integrated circuit (ASIC), a field programmable gate array (FPGA), or the like can be used as an operating circuit.

The control device 180 executes the programs stored in the ROM using the CPU thereby to achieve the following functions: a subject vehicle information acquisition function of acquiring subject vehicle information regarding the traveling state of the subject vehicle; an ambient information acquisition function of acquiring ambient information regarding objects and/or obstacles existing around the subject vehicle; a road shape determination function of determining the road shape of a road located ahead of the subject vehicle; an inter-vehicle distance setting function of setting the inter-vehicle distance from the preceding vehicle; and a travel control function (including automated or autonomous following function) of controlling travel of the subject vehicle. These functions of the control device 180 will be described below.

The control device 180 uses the subject vehicle information acquisition function to acquire subject vehicle information regarding the traveling state of the subject vehicle. For example, the control device 180 can use the subject vehicle information acquisition function to acquire, as the subject vehicle information, the positional information of the subject vehicle from the subject vehicle position detection device 110 and the vehicle speed information of the subject vehicle from the vehicle speed sensor 130.

The control device 180 uses the ambient information acquisition function to acquire ambient information regarding objects and/or obstacles around the subject vehicle. For example, the control device 180 can use the ambient information acquisition function to acquire the presence or absence of a surrounding vehicle traveling around the subject vehicle as the ambient information from the ranging sensor 140 (examples of the surrounding vehicle include a preceding vehicle traveling ahead in the traveling lane of the subject vehicle and another vehicle traveling in an adjacent lane to the traveling lane of the subject vehicle). When a surrounding vehicle is present around the subject vehicle, the control device 180 can use the ambient information acquisition function to acquire information on the position of the surrounding vehicle and the relative distance and relative speed between the subject vehicle and the surrounding vehicle as the ambient information from the ranging sensor 140. The control device 180 can also use the ambient information acquisition function to calculate the absolute vehicle speed of the surrounding vehicle on the basis of the vehicle speed of the subject vehicle acquired using the subject vehicle information acquisition function and the relative speed between the subject vehicle and the surrounding vehicle and acquire the calculated absolute vehicle speed of the surrounding vehicle as the ambient information.

The control device 180 uses the road shape determination function to determine whether or not the road located ahead of the subject vehicle is a road having a specific shape. Details of a method of determining the road shape using the road shape determination function will be described later.

The control device 180 uses the inter-vehicle distance setting function to set the inter-vehicle distance between the preceding vehicle and the subject vehicle. When the driver preliminarily sets the set inter-vehicle distance from the preceding vehicle via the input device 160, the inter-vehicle distance setting function serves to set the inter-vehicle distance between the preceding vehicle and the subject vehicle to the set inter-vehicle distance (e.g. any value of three stages of a short distance, a medium distance, and a long distance). When the preceding vehicle becomes absent during the inter-vehicle distance control, the inter-vehicle distance setting function serves to suspend or cancel the inter-vehicle distance control until the preceding vehicle or another preceding vehicle appears next. Details of a method of setting the inter-vehicle distance using the inter-vehicle distance setting function will be described later.

The control device 180 uses the travel control function to control the drive mechanism 170 thereby to execute the automated or autonomous travel control in which all or part of the travel of the subject vehicle is performed in an automated or autonomous manner. For example, when a preceding vehicle is present ahead of the subject vehicle, the travel control function in the present embodiment serves to control the operation of the drive mechanism 170, such as the engine and brake, thereby to execute the inter-vehicle distance control in which the subject vehicle is controlled to travel so as to separate from the preceding vehicle by an inter-vehicle distance that is set using the inter-vehicle distance setting function. In addition or alternatively, when a preceding vehicle is present ahead of the subject vehicle, the travel control function serves to control the operation of the drive mechanism 16, such as the engine, brake, and steering actuator, thereby to execute the automated or autonomous following control (also referred to as a "trajectory-following travel mode," hereinafter) in which the subject vehicle is controlled to travel so as to follow the traveling trajectory, along which the preceding vehicle has traveled, with an inter-vehicle distance between the subject vehicle and the preceding vehicle that is set using the inter-vehicle distance setting function. When no preceding vehicle is present ahead of the subject vehicle, the travel control function serves to control the operation of the drive mechanism 170, such as the engine and brake, thereby to execute the constant-speed travel control in which the subject vehicle is controlled to travel at a certain set vehicle speed that is set by the driver.

Figure 2:
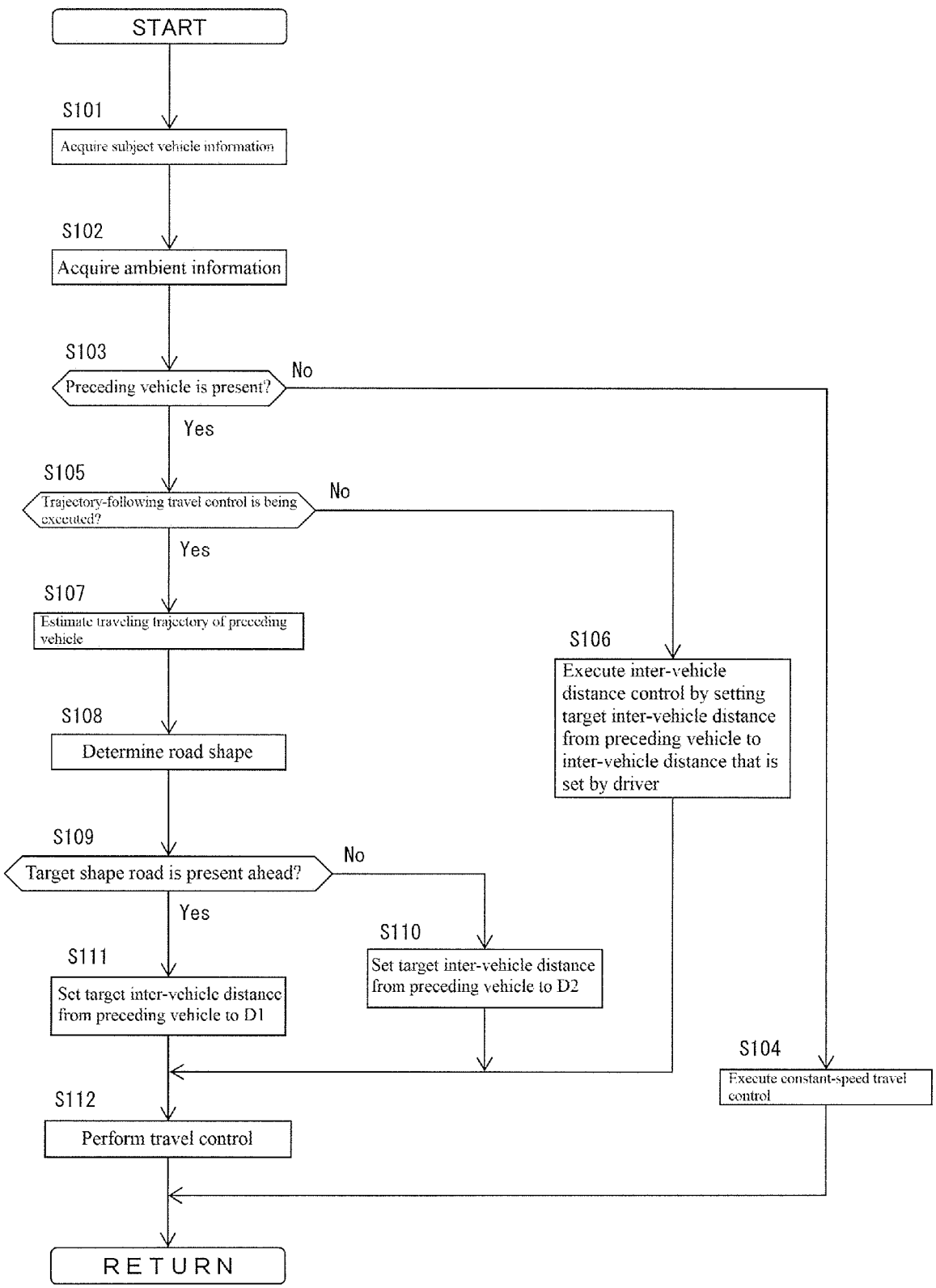
FIG. 2 is a flowchart illustrating a travel control process executed in a control device of FIG. 1.

The travel control process of the present embodiment will then be described. FIG. 2 is a flowchart illustrating the travel control process according to the present embodiment. The travel control process described below is executed by the control device 180. The travel control process described below is started when the ignition switch or power switch is turned on, and repeatedly executed with a predetermined period (e.g. every 10 ms) until the ignition switch or power switch is turned off.

The following description is based on an exemplary scene in which the automated or autonomous travel control is input (turned on) by the driver. That is, in this exemplary scene, the driver sets the automated or autonomous travel control to "ON" via the input device 160 and, thereby, when a preceding vehicle is present ahead of the subject vehicle, the inter-vehicle distance control is performed in which the subject vehicle is controlled to travel so as to separate from the preceding vehicle by an inter-vehicle distance that is set by the driver, while when no preceding vehicle is present ahead of the subject vehicle, the constant-speed travel control is performed in which the subject vehicle is controlled to travel at a set vehicle speed that is set by the driver. When the trajectory-following travel mode is input (turned on) by the driver during the automated or autonomous travel control, the trajectory-following travel control is executed in priority to the above inter-vehicle distance control and constant-speed travel control, provided that the condition for the trajectory-following travel control is established.

In step S101, the subject vehicle information acquisition function of the control device 180 serves first to perform acquisition of the subject vehicle information regarding the traveling state of the subject vehicle. For example, the subject vehicle information acquisition function can serve to acquire, as the subject vehicle information, the positional information of the subject vehicle from the subject vehicle position detection device 110 and the vehicle speed information of the subject vehicle from the vehicle speed sensor 130.

In step S102, the ambient information acquisition function of the control device 180 serves to perform acquisition of the ambient information regarding obstacles around the subject vehicle. For example, the ambient information acquisition function can serve to acquire the presence or absence of a surrounding vehicle traveling around the subject vehicle as the ambient information (examples of the surrounding vehicle include a preceding vehicle traveling ahead in the traveling lane of the subject vehicle and another vehicle traveling in an adjacent lane to the traveling lane of the subject vehicle). When a surrounding vehicle is present around the subject vehicle, the ambient information acquisition function can serve to acquire information on the relative position of the surrounding vehicle, the relative distance and relative speed between the subject vehicle and the surrounding vehicle, and the absolute vehicle speed of the surrounding vehicle as the ambient information.

In step S103, the inter-vehicle distance setting function serves to determine whether or not a preceding vehicle is present ahead of the subject vehicle. When a determination is made that no preceding vehicle is present, the process proceeds to step S104. In step S104, the constant-speed travel control is performed in which the subject vehicle is controlled to travel at a set vehicle speed that is set by the driver, because a determination has been made in step S104 that no preceding vehicle is present.

On the other hand, when a determination is made in step S103 that a preceding vehicle is present, the process proceeds to step S105. In step S105, the travel control function serves to determine whether or not the trajectory-following travel control is performed. In the present embodiment, when a preceding vehicle is present, the driver operates the input device 160 thereby to input (turn on) the trajectory-following travel mode in which the subject vehicle is controlled to travel in accordance with the traveling trajectory of the preceding vehicle, and the trajectory-following travel control rather than the inter-vehicle distance control is thus executed.

When the trajectory-following travel mode is not input in step S105, the process proceeds to step S106. In step S106, the inter-vehicle distance control is executed in which the subject vehicle is controlled to travel so as to separate from the preceding vehicle by a set inter-vehicle distance (e.g. any of three stages of a short distance, a medium distance, and a long distance) that is set by the driver. If the inter-vehicle distance is not set by the driver, a maximum inter-vehicle distance D3 as the initial value, for example, is set.

When the trajectory-following travel mode is input in step S105, the process proceeds to step S107, in which the traveling trajectory of the preceding vehicle is estimated. Estimation of the trajectory of the preceding vehicle may include estimating the traveling trajectory of the subject vehicle from the vehicle speed of the subject vehicle detected by the vehicle speed sensor 130 and the yaw rate of the subject vehicle detected by the yaw rate sensor 190 and calculating and estimating the traveling trajectory of the preceding vehicle on the basis of the estimated traveling trajectory of the subject vehicle and the relative positions of the preceding vehicle in the longitudinal and lateral directions detected by the ranging sensor 140 and the camera 150.

In step S108, the road shape determination function serves to perform a road shape determination process of determining whether or not the road located ahead of the subject vehicle is a target shape road, such as a curve, an intersection, a slope, or an interchange (including a junction). The road shape determination process when the target shape road is a curve will be described. The subject vehicle information acquisition function serves first to acquire the positional information and vehicle speed information of the subject vehicle. On the basis of the position and vehicle speed of the subject vehicle and the map information of the map database 120, a curvature radius R of the road located ahead of the subject vehicle is acquired. Then, the road shape determination function serves to determine whether or not the curvature radius R of the road located ahead of the subject vehicle is less than a curvature radius threshold $R_{th}$ that is preliminarily set. When the curvature radius R of the road located ahead of the subject vehicle is less than the curvature radius threshold $R_{th}$, a determination is made that the road located ahead of the subject vehicle is a curve. On the other hand, when the curvature radius R of the road located ahead of the subject vehicle is not less than the curvature radius threshold $R_{th}$, a determination is made that the road located ahead of the subject vehicle is not a curve. For other target shape roads, such as an intersection, a slope, and an interchange (including a junction), a determination is made in the same manner on the basis of the position and vehicle speed of the subject vehicle and the map information of the map database 120.

In the subsequent step S109, a determination is made as to whether or not the above-described target shape road, such as a curve, an intersection, a slope, or an interchange (including a junction), is present on the road located ahead of the subject vehicle. When no target shape road is present on the road located ahead of the subject vehicle, the process proceeds to step S110, in which the target inter-vehicle distance between the subject vehicle and the preceding vehicle in the trajectory-following travel mode is set to a relatively small value from among settable values, and the travel control is then executed in step S112. For example, when the settable values for the target inter-vehicle distance include at least three distances of a first inter-vehicle distance D1, a second inter-vehicle distance D2 larger than the first inter-vehicle distance D1, and a third inter-vehicle distance D3 larger than the second inter-vehicle distance D2 (D1<D2<D3), the target inter-vehicle distance is set to D2 in the present embodiment. In an alternative embodiment, the target inter-vehicle distance may be set to D1.

Figure 3:
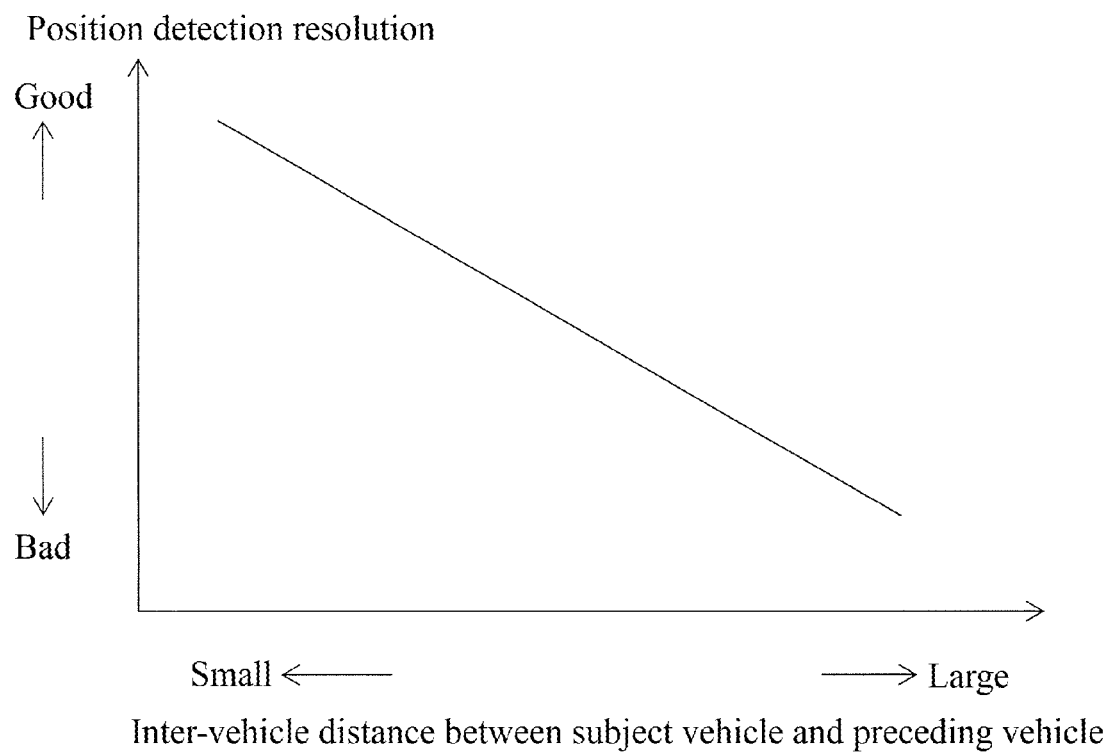
FIG. 3 is a graph illustrating the relationship between the inter-vehicle distance from the subject vehicle to a preceding vehicle and the position detection resolution for a traveling trajectory of the preceding vehicle.

FIG. 3 is a graph illustrating the relationship between the inter-vehicle distance from the subject vehicle to a preceding vehicle and the position detection resolution for the traveling trajectory of the preceding vehicle. As described above, estimation of the trajectory of the preceding vehicle may include estimating the traveling trajectory of the subject vehicle from the vehicle speed of the subject vehicle detected by the vehicle speed sensor 130 and the yaw rate of the subject vehicle detected by the yaw rate sensor 190 and calculating and estimating the traveling trajectory of the preceding vehicle on the basis of the estimated traveling trajectory of the subject vehicle and the relative positions of the preceding vehicle in the longitudinal and lateral directions detected by the ranging sensor 140 and the camera 150. As illustrated in FIG. 3, however, the detection resolution for the relative positions of the preceding vehicle in the longitudinal and lateral directions detected by the ranging sensor 140 and the camera 150 deteriorates as the inter-vehicle distance between the subject vehicle and the preceding vehicle increases. Deterioration in the detection resolution for the relative position of the preceding vehicle disturbs the estimated traveling trajectory of the preceding vehicle and, if the steering control is performed such that the estimated traveling trajectory of the preceding vehicle is employed as the target traveling trajectory without any change, the traveling trajectory of the subject vehicle may also be disturbed. In the present embodiment, therefore, when the trajectory-following travel mode transitions from the OFF state to the ON state, the target inter-vehicle distance between the subject vehicle and the preceding vehicle is set to a relatively small value from among the settable values.

Figure 4:
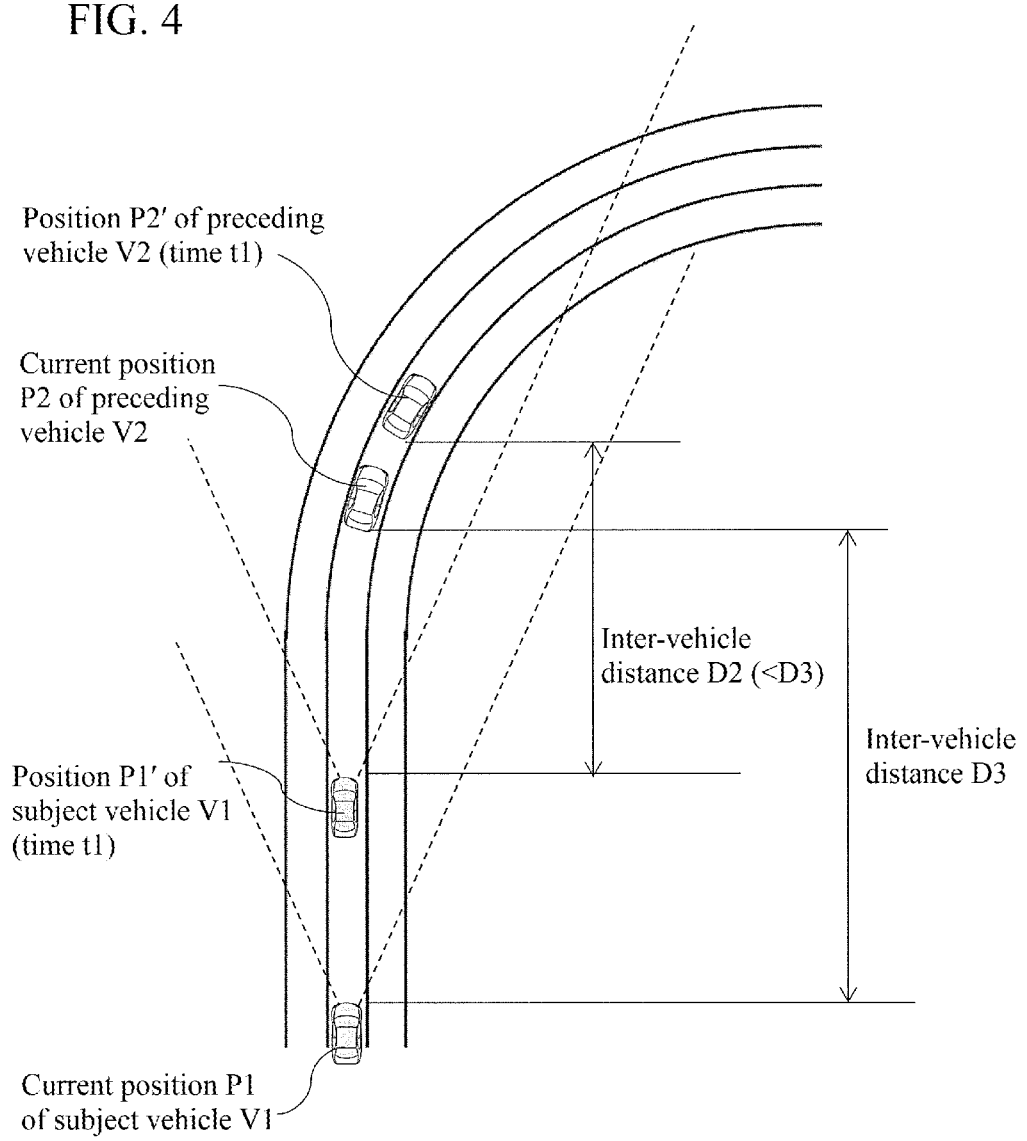
FIG. 4 is a plan view illustrating an example of a scene in which the trajectory-following travel mode of the subject vehicle has turned to the ON state.

FIG. 4 is a plan view illustrating an example of a scene in which the trajectory-following travel mode of the subject vehicle has turned to the ON state. When the trajectory-following travel mode is input in a state in which the subject vehicle V1 is traveling at its current position P1 and the preceding vehicle V2 is traveling at its current position P2 located ahead of the current position P1 by the inter-vehicle distance D3 (steps S105 to S110), the target inter-vehicle distance is set from the current distance D3 to a target inter-vehicle distance D2 smaller than D3 to execute the travel control in which the subject vehicle is controlled to come close to the preceding vehicle. Through this operation, at a time t1, the subject vehicle V1 is located at a position P1' while the preceding vehicle V2 is located at a position P2', and the inter-vehicle distance therebetween is reduced to the target inter-vehicle distance D2. This can enhance the detection resolution for the relative positions of the preceding vehicle in the longitudinal and lateral directions detected by the ranging sensor 140 and the camera 150, as illustrated in FIG. 3, and the disturbance in the estimated traveling trajectory of the preceding vehicle is therefore suppressed. As a result, the disturbance in the traveling trajectory of the subject vehicle can be suppressed.

Referring again to step S109 of FIG. 2, when a target shape road is present on the road located ahead of the subject vehicle, the process proceeds to step S111, in which the target inter-vehicle distance between the subject vehicle and the preceding vehicle in the trajectory-following travel mode is set to a relatively small value from among settable values, and the travel control is then executed in step S112. For example, when the settable values for the target inter-vehicle distance include at least three distances of the first inter-vehicle distance D1, the second inter-vehicle distance D2 larger than the first inter-vehicle distance D1, and the third inter-vehicle distance D3 larger than the second inter-vehicle distance D2 (D1<D2<D3), the target inter-vehicle distance is set to D1 in the present embodiment. In an alternative embodiment, the target inter-vehicle distance may be set to D2.

Figure 5A:
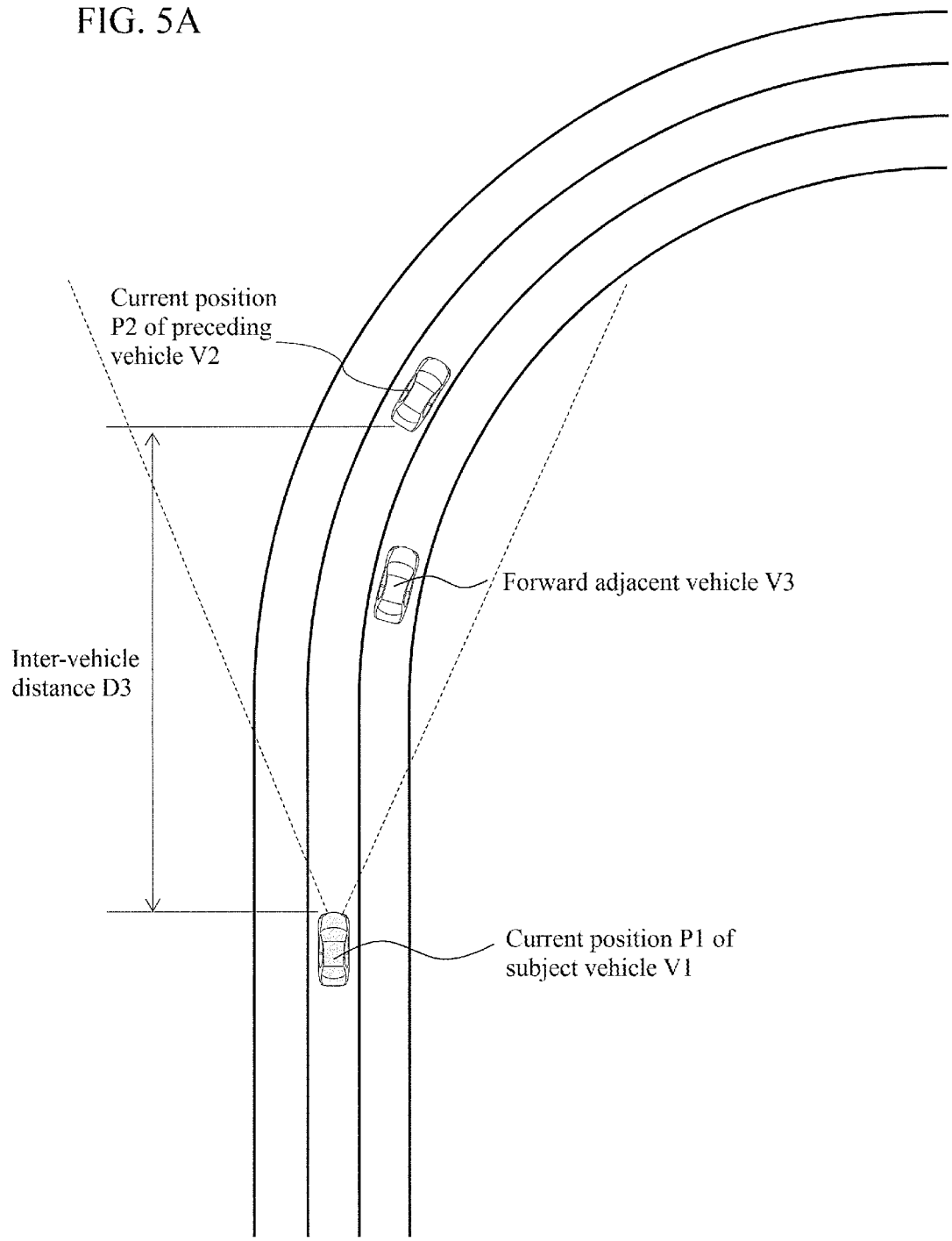
FIG. 5A is a plan view illustrating an example of a scene of entering a curve in the ON state of the trajectory-following travel mode of the subject vehicle.
Figure 5B:
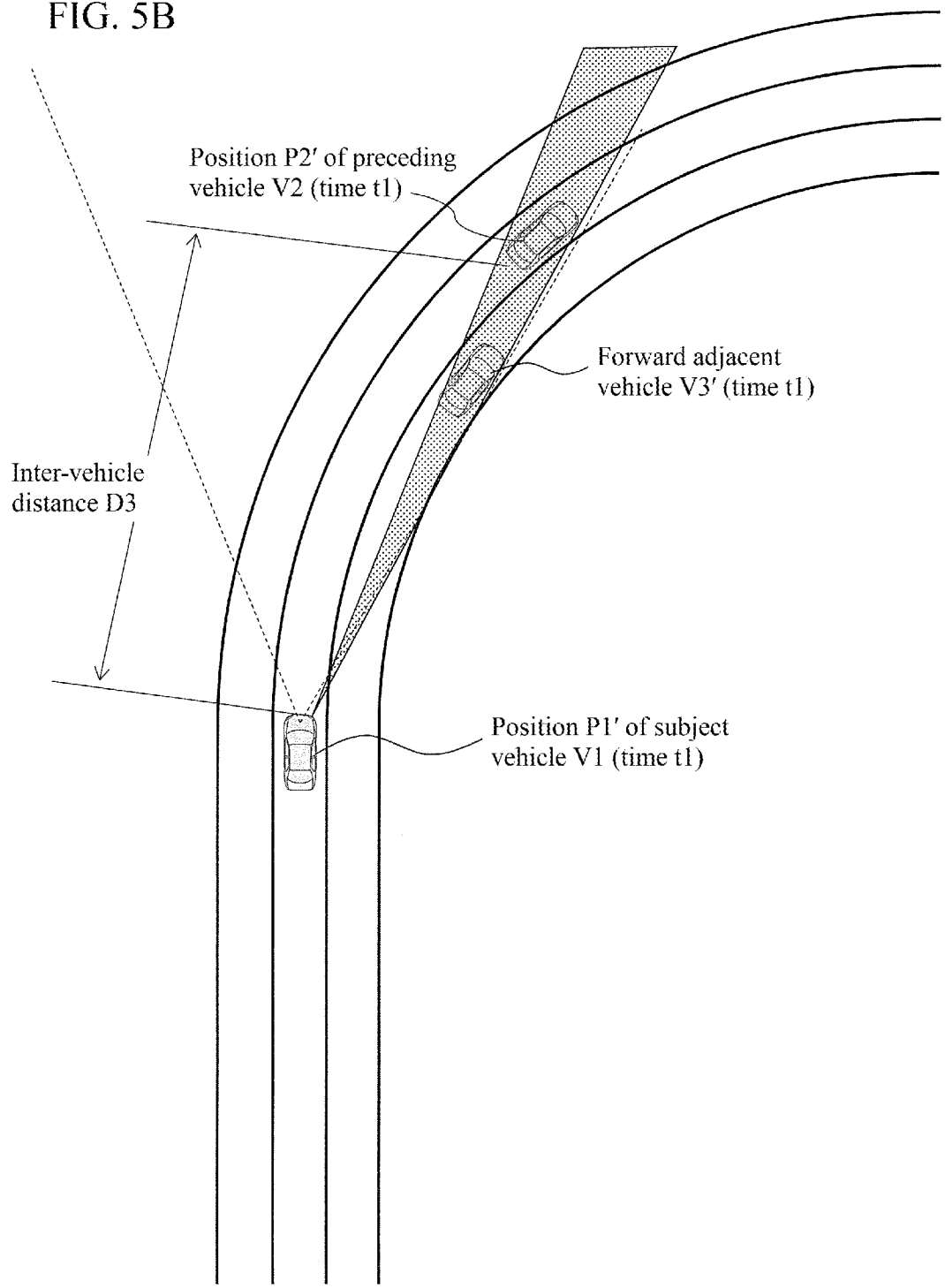
FIG. 5B is a plan view illustrating an example (Comparative Example) of a scene of traveling along the curve while maintaining an inter-vehicle distance D3 from the scene illustrated in FIG. 5A.

FIG. 5A is a plan view illustrating an example of a scene of entering a curve in the ON state of the trajectory-following travel mode of the subject vehicle. The subject vehicle V1 is traveling at its current position P1 and the preceding vehicle V2 is traveling at its current position P2 located ahead in the traveling lane of the subject vehicle by the inter-vehicle distance D3. In addition, another vehicle (forward adjacent vehicle V3) is traveling in the right-side adjacent traveling lane to the traveling lane of the subject vehicle. If the vehicles travel along the curve while maintaining the inter-vehicle distance D3, the state of FIG. 5B may arise. FIG. 5B is a plan view illustrating an example (Comparative Example) of a scene of traveling along the curve while maintaining the inter-vehicle distance D3 from the scene illustrated in FIG. 5A. That is, the forward adjacent vehicle V3 enters the irradiation area of the ranging sensor 140 for detecting a preceding vehicle from the subject vehicle and/or the field of view of the camera 150, so that the preceding vehicle enters the blind area of the forward adjacent vehicle to cause a time period during which the relative positions of the preceding vehicle in the longitudinal and lateral directions cannot be detected. As a result, the traveling trajectory of the preceding vehicle cannot be estimated during that period.

Figure 5C:
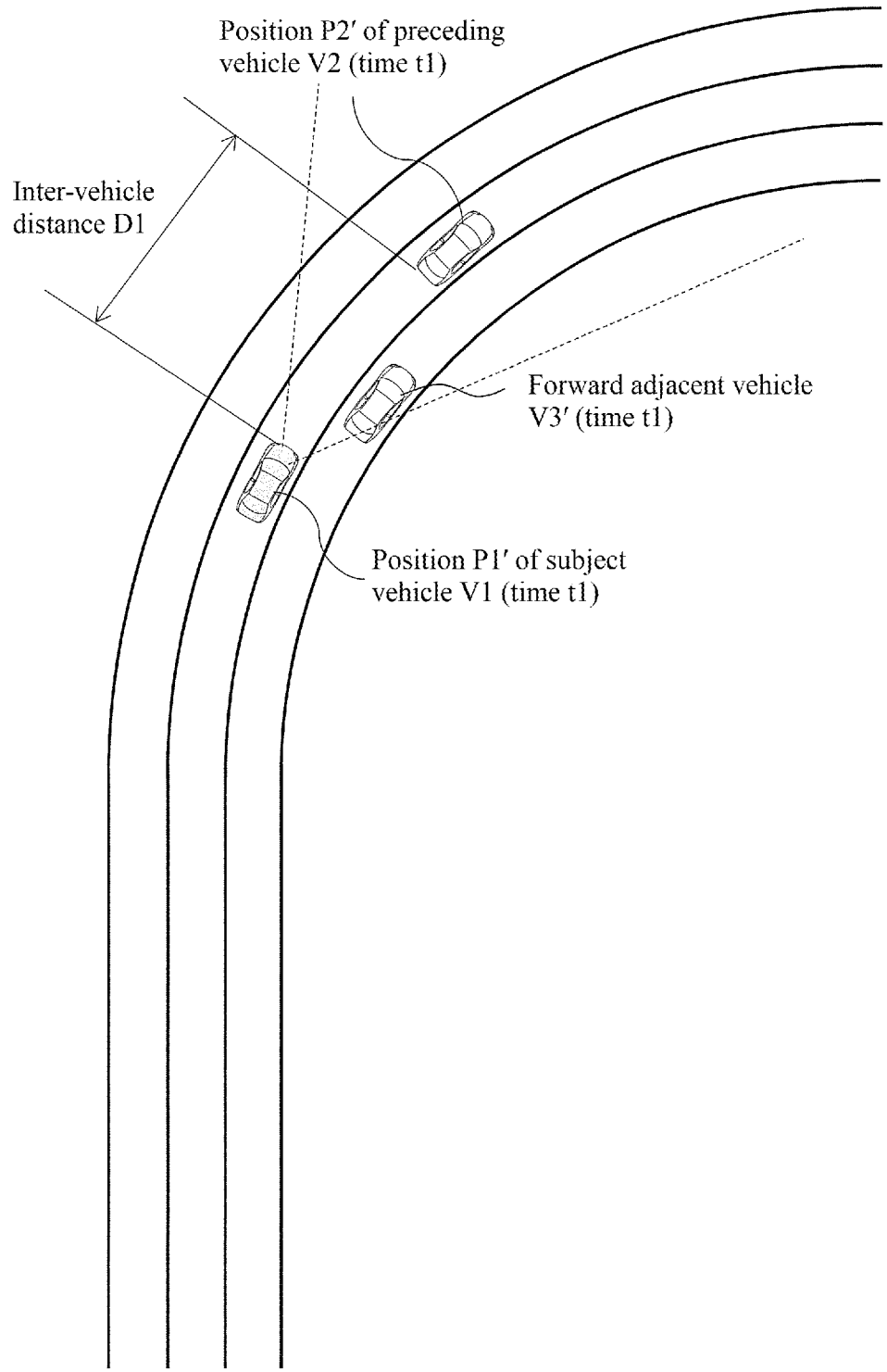
FIG. 5C is a plan view illustrating an example (Example) of a scene of traveling along the curve by setting the inter-vehicle distance to D1 (<D3) in the scene illustrated in FIG. 5A.

On the other hand, FIG. 5C is a plan view illustrating an example (Example) of a scene of traveling along the curve by setting the inter-vehicle distance to D1 (<D3) in the scene illustrated in FIG. 5A. It is recognized that the curve is present ahead of the subject vehicle in the scene of FIG. 5A; therefore, when the target inter-vehicle distance is reduced from D3 to D1 before traveling along the curve, the target inter-vehicle distance between the subject vehicle and the preceding vehicle is reduced to D1 during the travel along the curve, as illustrated in FIG. 5C, so that the forward adjacent vehicle V3 does not enter the irradiation area of the ranging sensor 140 and the field of view of the camera 150, and the relative positions of the preceding vehicle in the longitudinal and lateral directions can be continuously detected. As a result, the trajectory-following travel control for the subject vehicle can be smoothly executed to allow the traveling trajectory of the subject vehicle to be smooth. The circumstances in such a general curve are the same on a road having a small curvature radius, such as an interchange or a junction of an expressway.

Figure 6A:
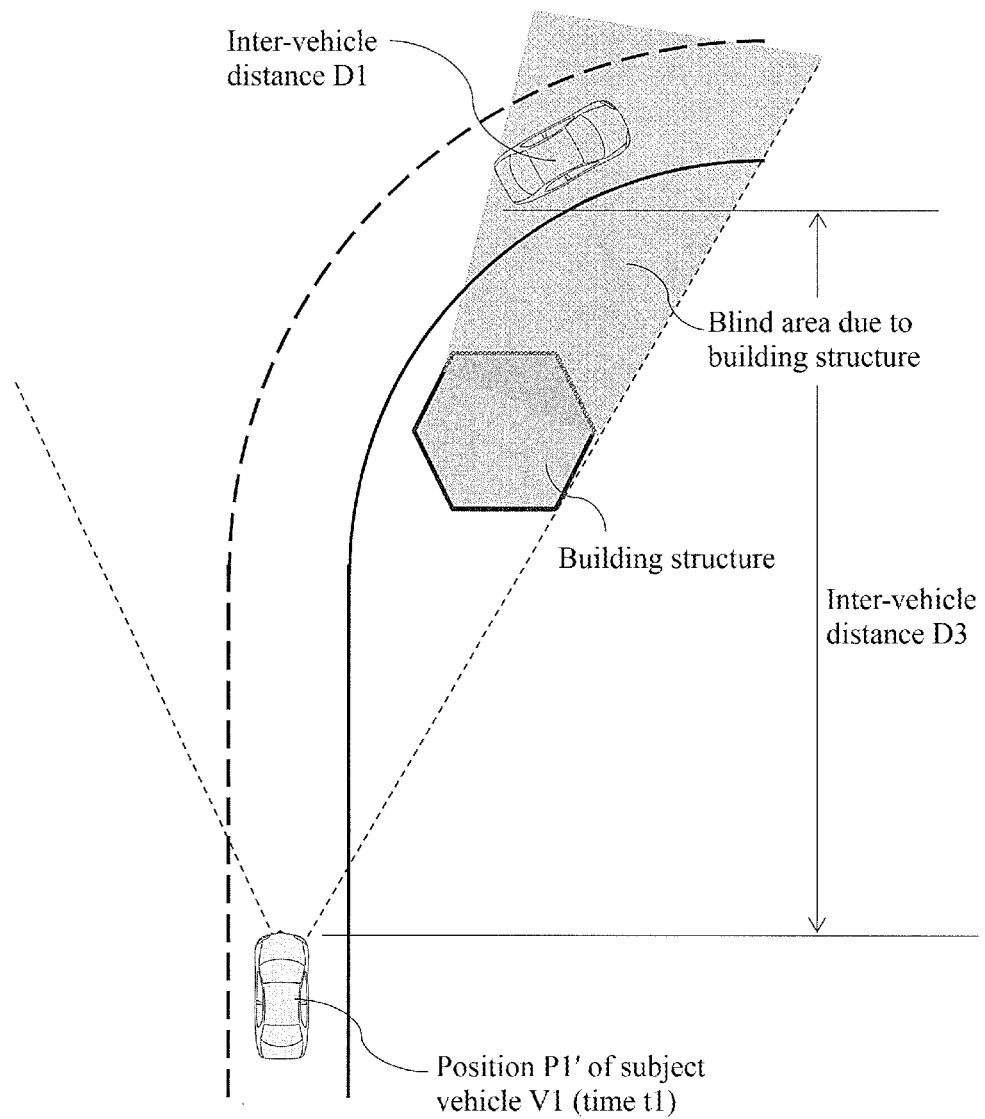
FIG. 6A is a plan view illustrating an example (Comparative Example) of a scene of traveling through an intersection with a building structure while maintaining the inter-vehicle distance D3 in the ON state of the trajectory-following travel mode of the subject vehicle.

FIG. 6A is a plan view illustrating an example (Comparative Example) of a scene of traveling through an intersection with a building structure while maintaining the inter-vehicle distance D3 in the ON state of the trajectory-following travel mode of the subject vehicle. In an intersection or the like, building structures or other objects interfering with the irradiation area of the ranging sensor 140 and/or the field of view of the camera 150 may often exist. Accordingly, if the target inter-vehicle distance between the subject vehicle and the preceding vehicle is set to a large value such as D3, as illustrated in FIG. 6A, then a building structure may enter the irradiation area of the ranging sensor 140 for detecting a preceding vehicle from the subject vehicle and/or the field of view of the camera 150, so that the preceding vehicle enters the blind area of the building structure to cause a time period during which the relative positions of the preceding vehicle in the longitudinal and lateral directions cannot be detected. As a result, the traveling trajectory of the preceding vehicle cannot be estimated during that period.

Figure 6B:
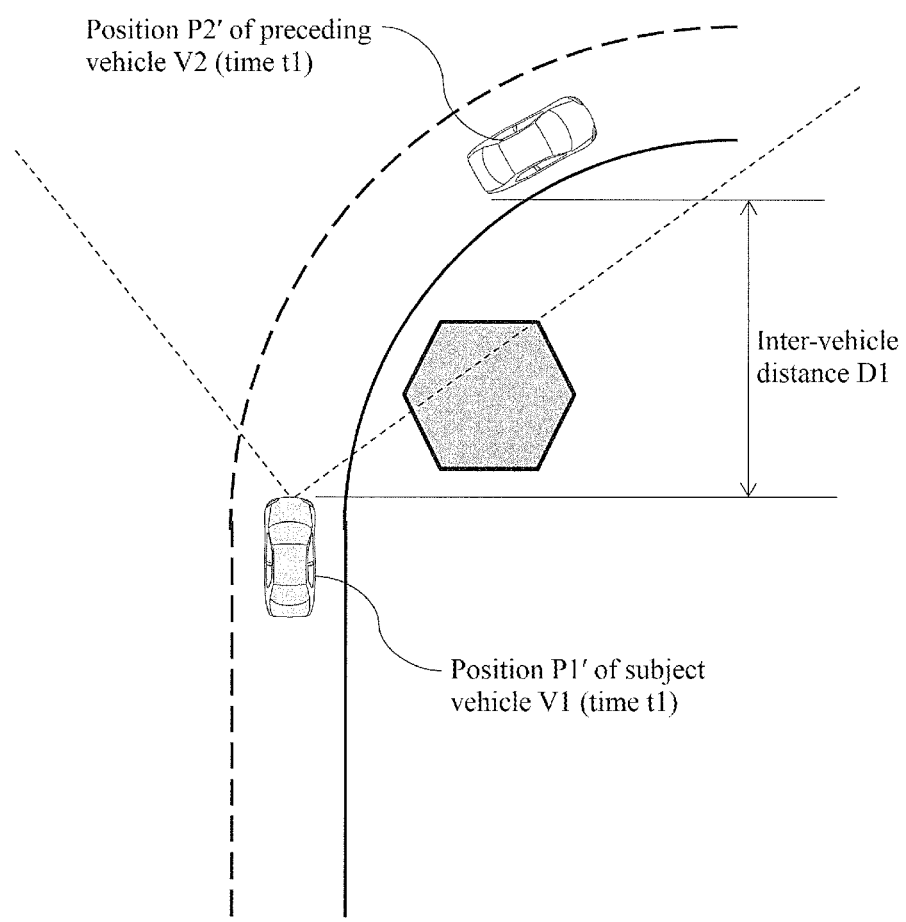
FIG. 6B is a plan view illustrating an example (Example) of a scene of traveling through the intersection with the building structure by setting the inter-vehicle distance to D1 (<D3) when entering the intersection in the ON state of the trajectory-following travel mode of the subject vehicle.

On the other hand, FIG. 6B is a plan view illustrating an example (Example) of a scene of traveling through the intersection with the building structure by setting the inter-vehicle distance to D1 (<D3) when entering the intersection in the ON state of the trajectory-following travel mode of the subject vehicle. It is recognized that the intersection is present ahead of the subject vehicle in the scene of FIG. 6A; therefore, when the target inter-vehicle distance is reduced from D3 to D1 before traveling through the intersection, the target inter-vehicle distance between the subject vehicle and the preceding vehicle is reduced to D1 during the travel through the intersection, as illustrated in FIG. 6B, so that the building structure does not enter the irradiation area of the ranging sensor 140 and the field of view of the camera 150, and the relative positions of the preceding vehicle in the longitudinal and lateral directions can be continuously detected. As a result, the trajectory-following travel control for the subject vehicle can be smoothly executed to allow the traveling trajectory of the subject vehicle to be smooth.

Figure 7:
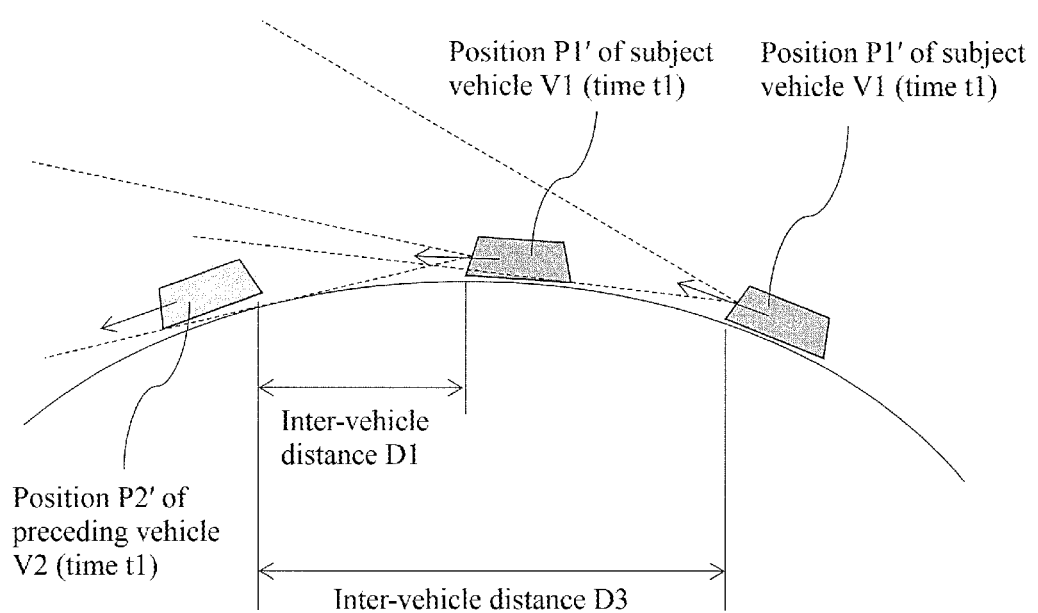
FIG. 7 is a plan view illustrating an example (Comparative Example) of a scene of traveling along a slope while maintaining the inter-vehicle distance D3 in the ON state of the trajectory-following travel mode of the subject vehicle and an example (Example) of a scene of traveling along the slope by setting the inter-vehicle distance to D1 (<D3) when entering the slope.

FIG. 7 is a plan view illustrating an example (Comparative Example) of a scene of traveling along a slope while maintaining the inter-vehicle distance D3 in the ON state of the trajectory-following travel mode of the subject vehicle and an example (Example) of a scene of traveling along the slope by setting the inter-vehicle distance to D1 (<D3) when entering the slope. The irradiation area of the ranging sensor 140 for detecting a preceding vehicle from the subject vehicle and the field of view of the camera 150 spread not only in the horizontal direction but also in the vertical direction. Accordingly, if the target inter-vehicle distance between the subject vehicle and the preceding vehicle is set to a large value such as D3 in the transition area from the upslope to the downslope or the transition area from the downslope to the upslope, as illustrated in FIG. 7, then the preceding vehicle V2 may fall outside the irradiation area of the ranging sensor 140 for detecting a preceding vehicle from the subject vehicle and/or the field of view of the camera 150, thereby to cause a time period during which the relative positions of the preceding vehicle in the longitudinal and lateral directions cannot be detected. As a result, the traveling trajectory of the preceding vehicle cannot be estimated during that period.

In this context, it is recognized that the slope is present ahead of the subject vehicle before the scene illustrated in FIG. 7; therefore, when the target inter-vehicle distance is reduced from D3 to D1 before traveling along the slope, the target inter-vehicle distance between the subject vehicle and the preceding vehicle is reduced to D1 during the travel along the slope, as illustrated in FIG. 7, so that the preceding vehicle V2 can be captured in the irradiation area of the ranging sensor 140 and/or the field of view of the camera 150, and the relative positions of the preceding vehicle in the longitudinal and lateral directions can be continuously detected. As a result, the trajectory-following travel control for the subject vehicle can be smoothly executed to allow the traveling trajectory of the subject vehicle to be smooth.

As described above, in the present embodiment, when the trajectory-following travel mode transitions from the OFF state to the ON state, the target inter-vehicle distance between the subject vehicle V1 and the preceding vehicle V2 is set to a relatively small value D1 or D2 from among the settable values, and the subject vehicle therefore comes relatively close to the preceding vehicle. This allows the preceding vehicle to be easily detected.

Moreover, in the present embodiment, when the trajectory-following travel mode is in the ON state and the subject vehicle V1 approaches a curve, an intersection, a slope, or an interchange, the target inter-vehicle distance is set to a relatively further smaller value D1 or D2 than the current set value. Through this operation, another vehicle or a building structure does not enter the irradiation area of the ranging sensor 140 and the field of view of the camera 150 and the preceding vehicle does not fall outside the irradiation area and the field of view, so that the relative positions of the preceding vehicle in the longitudinal and lateral directions can be continuously detected. As a result, the trajectory-following travel control for the subject vehicle can be smoothly executed to allow the traveling trajectory of the subject vehicle to be smooth.

The above-described control device 180 corresponds to the controller of the present invention.

DESCRIPTION OF REFERENCE NUMERALS

100 Travel control apparatus
110 Subject vehicle position detection device

120 Map database
130 Vehicle speed sensor
140 Ranging sensor
150 Camera
160 Input device
170 Drive mechanism
180 Control device
190 Yaw rate sensor

The invention claimed is:

1. A travel control method for a vehicle wherein a certain target inter-vehicle distance is set from among a plurality of settable target inter-vehicle distances and a subject vehicle is controlled to follow, in an automated or autonomous manner, a traveling trajectory of a preceding vehicle traveling ahead of the subject vehicle, the travel control method comprising, when a trajectory-following travel mode for following the traveling trajectory of the preceding vehicle in the automated or autonomous manner transitions from an OFF state to an ON state, setting the target inter-vehicle distance between the subject vehicle and the preceding vehicle to a relatively small value from among the settable values.

2. The travel control method for a vehicle according to claim 1, wherein when the trajectory-following travel mode is in the ON state and the subject vehicle approaches a curve, an intersection, a slope, or an interchange, the target inter-vehicle distance is set to a relatively further smaller value than the current set value.

3. A travel control method for a vehicle wherein a certain target inter-vehicle distance is set from among a plurality of settable target inter-vehicle distances and a subject vehicle is controlled to follow, in an automated or autonomous manner, a traveling trajectory of a preceding vehicle traveling ahead of the subject vehicle, the travel control method comprising, when a trajectory-following travel mode for following the traveling trajectory of the preceding vehicle in the automated or autonomous manner is in the ON state and the subject vehicle approaches a curve, an intersection, a slope, or an interchange, setting the target inter-vehicle distance between the subject vehicle and the preceding vehicle to a relatively small value from among the settable values.

4. The travel control method for a vehicle according to claim 1, wherein when the settable values of the target inter-vehicle distance include a first distance, a second distance larger than the first distance, and a third distance larger than the second distance and the trajectory-following travel mode transitions from the OFF state to the ON state, the target inter-vehicle distance is set to the first distance or the second distance.

5. The travel control method for a vehicle according to claim 4, wherein when the trajectory-following travel mode is in the ON state, the target inter-vehicle distance is set to the second distance, and in this state, when the subject vehicle approaches a curve, an intersection, a slope, or an interchange, the target inter-vehicle distance is set to the first distance.

6. A travel control apparatus for a vehicle, comprising a controller configured to set a certain target inter-vehicle distance from among a plurality of settable target inter-vehicle distances and perform travel control of a subject vehicle so as to follow, in an automated or autonomous manner, a traveling trajectory of a preceding vehicle traveling ahead of the subject vehicle, the controller being further configured to, when an automated or autonomous travel mode for following the traveling trajectory of the preceding vehicle in the automated or autonomous manner transitions from an OFF state to an ON state, set the target inter-vehicle distance between the subject vehicle and the preceding vehicle to a relatively small value from among the settable values.

7. The travel control method for a vehicle according to claim 3, wherein when the settable values of the target inter-vehicle distance include a first distance, a second distance larger than the first distance, and a third distance larger than the second distance and the trajectory-following travel mode transitions from the OFF state to the ON state, the target inter-vehicle distance is set to the first distance or the second distance.

8. The travel control method for a vehicle according to claim 7, wherein when the trajectory-following travel mode is in the ON state, the target inter-vehicle distance is set to the second distance, and in this state, when the subject vehicle approaches a curve, an intersection, a slope, or an interchange, the target inter-vehicle distance is set to the first distance.

* * * * *